(12) United States Patent
Han et al.

(10) Patent No.: US 7,084,599 B2
(45) Date of Patent: Aug. 1, 2006

(54) INDUCTION MOTOR CONTROLLER

(75) Inventors: Seung-Do Han, Incheon (KR); Hyoun-Jeong Shin, Incheon (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 10/994,400

(22) Filed: Nov. 23, 2004

(65) Prior Publication Data

US 2006/0006831 A1    Jan. 12, 2006

(30) Foreign Application Priority Data

Jul. 8, 2004    (KR) ............... 10-2004-0053007

(51) Int. Cl.
*H02P 5/28*    (2006.01)

(52) U.S. Cl. .................. 318/783; 318/778; 310/68 C; 310/166

(58) Field of Classification Search ............... 318/778, 318/782, 783, 785, 445, 471, 727, 788; 310/68 C, 310/166
See application file for complete search history.

(56) References Cited

U.S. PATENT DOCUMENTS

| | | | | |
|---|---|---|---|---|
| 5,345,126 | A | * | 9/1994 | Bunch ................. 310/68 C |
| 5,391,971 | A | * | 2/1995 | Yamada et al. ............ 318/778 |
| 5,861,697 | A | * | 1/1999 | Sugita et al. ............ 310/166 |
| 6,445,092 | B1 | | 9/2002 | Marder et al. |
| 6,700,270 | B1 | | 3/2004 | Yanashima et al. |

FOREIGN PATENT DOCUMENTS

| | | |
|---|---|---|
| DE | 3105444 | 7/1982 |
| DE | 3702952 | 8/1988 |
| EP | 0023465 | 2/1981 |
| EP | 1227568 | 7/2002 |
| JP | 58-43192 | 3/1983 |
| JP | 2001-061285 | 3/2001 |

OTHER PUBLICATIONS

U.S. Appl. No. 10/994,250.
U.S. Appl. No. 10/414,250.
English Language Abstract of DE 3702952.
English Language Abstract of JP 58-43192.
English Language Abstract of DE 3105444.
English Language Abstract of JP 2001-061285.

* cited by examiner

*Primary Examiner*—Paul Ip
(74) *Attorney, Agent, or Firm*—Greenblum & Bernstein, P.L.C.

(57) ABSTRACT

A motor controller is capable of swiftly driving a motor at the initial stage and driving the motor with high efficiency and low power consumption after swiftly driving the motor at the initial stage by including a first capacitor connected in series with stator coils of the motor and a PTC thermistor (Positive Temperature Coefficient thermistor) connected in parallel with the first capacitor.

9 Claims, 4 Drawing Sheets ial rotating magnetic field in the stator 100, four shading coils 170A,
INDUCTION MOTOR CONTROLLER

BACKGROUND OF THE INVENTION

1. Field of the Invention

The present invention relates to an induction motor, and particularly, to an induction motor controller.

2. Description of the Conventional Art

FIG. 1 is a view schematically showing a construction of an induction motor in accordance with the conventional art.

As shown in FIG. 1, the induction motor in accordance with the conventional art largely includes: a stator 100; an induction rotor 120; a permanent magnet rotor 150; and a rotating shaft 140.

The stator 100 is made up of four stator coils 160A, 160B, 160C and 160D respectively wound around an iron core 110 of the induction motor. Also, to generate an elliptical rotating magnetic field in the stator 100, four shading coils 170A, 170B, 170C and 170D are spatially disposed at regular angles on the iron core 110 at which the stator coils 160A, 160B, 160C and 160D are installed. Here, the four stator coils 160A, 160B, 160C and 160D are sequentially connected in series in order that the coils adjacent to each other have the same polarities.

The permanent magnet rotor 150 consists of a ring type permanent magnet (not shown) installed between the stator 100 and the induction rotor 120 at a predetermined gap and a permanent magnet supporting unit (not shown) for supporting the ring type permanent magnet. Also, to make the permanent magnet rotor 150 rotated centering around the rotating shaft 140, a bearing 130 is installed between the permanent magnet supporting unit and the rotating shaft 140.

Hereinafter, an equivalent circuit of the induction motor in accordance with the conventional art will be described with reference to FIG. 2.

FIG. 2 shows an equivalent circuit of an induction motor in accordance with the conventional art.

As shown in FIG. 2, the stator coils 160A, 160B, 160C and 160D of the induction motor in accordance with the conventional art are connected in series with each other, and the power (AC) is directly applied to the stator coils 160A, 160B, 160C and 160D. Here, to operate the induction motor with high efficiency, the winding number of the stator coils 160A, 160B, 160C and 160D of the induction motor is designed so as to be suitable for high efficiency features. Namely, in order to operate the induction motor with high efficiency, the winding number of the stator coils 160A, 160B, 160C and 160D is determined according to the power (AC).

Moreover, if the power (AC) is supplied to the stator coils 160A, 160B, 160C and 160D of the induction motor in accordance with the conventional art, the stator coils 160A, 160B, 160C and 160D generate magnetic fields. According to the magnetic fields generated by the stator coils 160A, 160B, 160C and 160D, the shading coils 170A, 170B, 170C and 170D generate magnetic fields. At this time, the stator 100 generates an elliptical rotating magnetic field obtained by composing the magnetic fields generated by the stator coils 160A, 160B, 160C and 160D and the magnetic fields generated by the shading coils 170A, 170B, 170C and 170.

The elliptical rotating magnetic filed generated by the stator 100 is transmitted to the permanent magnet rotor 150, which causes the permanent magnet rotor 150 to be rotated. While the permanent magnet rotor 150 is rotated, a rotating magnet field having a high magnetic flux is generated. The induction rotor 120 is rotated by the rotating magnetic field having the high magnetic flux and thus the rotating shaft 140 is rotated. Accordingly, the induction motor in accordance with the conventional art can be operated making a low noise by rotating the induction rotor 120 by the rotating magnetic field having the high magnetic flux generated when the permanent magnetic rotor 150 is rotated.

However, in the induction motor in accordance with the conventional art, since the power (AC) is directly applied to the stator coils 160A, 160B, 160C and 160D connected in series, a magnetomotive force is reduced when the induction motor is initially driven, and thus the induction motor cannot be swiftly driven at the initial stage because the magnetomotive force is reduced. That is, the induction motor in accordance with the conventional art is driven with high efficiency after its initial driving by directly applying the power to the stator coils 160A, 160B, 160C and 160D, but it has a problem that the induction motor cannot be swiftly driven due to the low magnetomotive force when the power is initially applied to the induction motor. For example, when the power is directly applied to the stator coils 160A, 160B, 160C and 160D, the induction motor is driven with high efficiency after its initial driving. However, when the induction motor is initially driven, since a current less than required current for the driving is applied to the stator, the magneto motive force is reduced, and thus the induction motor cannot be swiftly driven at the initial stage because the magnetomotive force is decreased.

Meanwhile, the induction motor in accordance with the conventional art is also disclosed in U.S. Pat. Nos. 6,700,270 and 6,445,092.

SUMMARY OF THE INVENTION

Therefore, an object of the present invention is to provide an induction motor controller which enables to swiftly drive the induction motor at the initial stage.

Another object of the present invention is to provide an induction motor controller which enables to drive the induction motor with high efficiency and low power consumption after swiftly driving the induction motor at the initial stage.

To achieve these and other advantages and in accordance with the purpose of the present invention, as embodied and broadly described herein, there is provided a motor controller including a first capacitor connected in series with stator coils of the motor and a PTC thermistor (Positive Temperature Coefficient thermistor) connected in parallel with the first capacitor.

To achieve these and other advantages and in accordance with the purpose of the present invention, as embodied and broadly described herein, there is provided an induction motor controller including a first capacitor connected in series with stator coils of the induction motor and a PTC thermistor (Positive Temperature Coefficient thermistor) connected in parallel with the first capacitor.

To achieve these and other advantages and in accordance with the purpose of the present invention, as embodied and broadly described herein, there is provided an induction motor including a stator having stator coils respectively wound around an iron core of the induction motor, an induction rotor, a permanent magnet rotor installed between the rotor and the induction rotor, and shading coils installed at the iron coil, further comprising: a first capacitor connected in series with the stator coils; and a PTC thermistor (Positive Temperature Coefficient thermistor) connected in parallel with the first capacitor.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Figure 1:
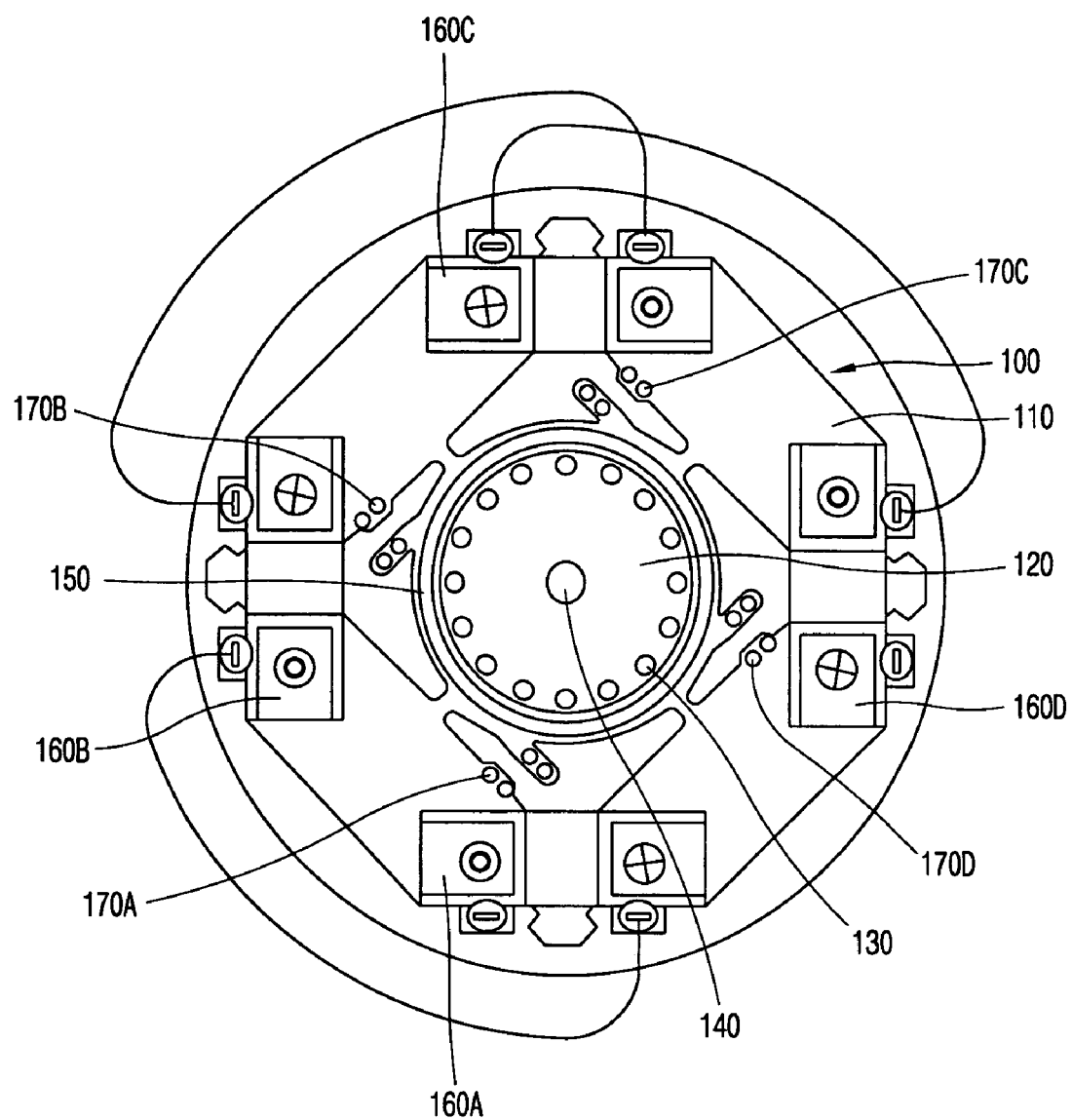
FIG. 1 is a view schematically showing a construction of an induction motor in accordance with the conventional art.
Figure 2:
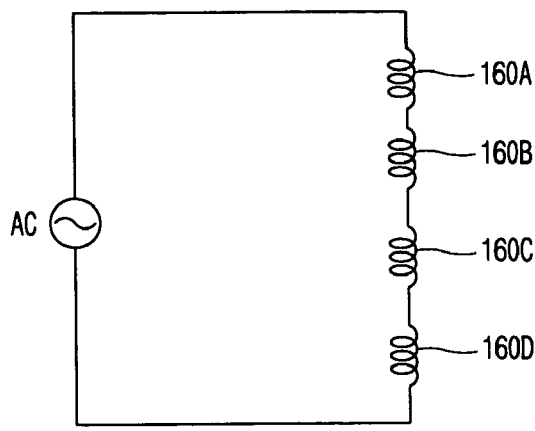
FIG. 2 is a view showing an equivalent circuit of the induction motor in accordance with the conventional art.

Hereinafter, descriptions will now be made in detail to preferred embodiments of an induction motor controller which enables to swiftly drive an induction motor at the initial stage and drive the induction motor with high efficiency and low power consumption after swiftly driving the induction motor at the initial stage, referring to FIGS. 3 to 8B. A structure of the induction motor in accordance with the present invention is the same as the conventional art, and thus detailed description concerning it is omitted. Moreover, the same reference numerals as the conventional art are used in the structure of the induction motor of the present invention which is the same as that of the induction motor of the conventional art.

Figure 3:
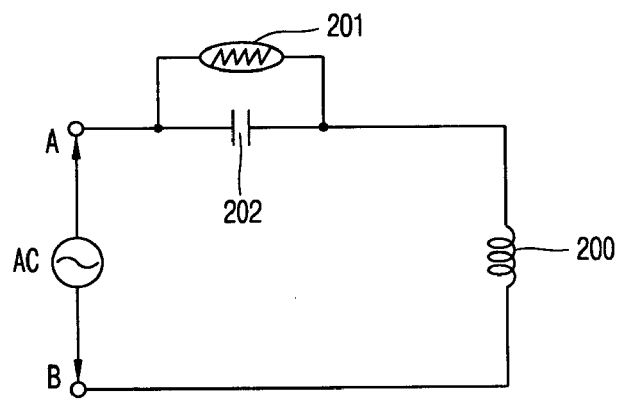
FIG. 3 is a schematic diagram showing a construction of an induction motor controller in accordance with a first embodiment of the present invention.

FIG. 3 is a schematic diagram showing a construction of an induction motor controller in accordance with a first embodiment of the present invention.

As shown in FIG. 3, the induction motor controller in accordance with the first embodiment of the present invention includes a capacitor 202 connected in series between a power terminal (A) and a stator coil 200, and a PTC thermistor (Positive Temperature Coefficient thermistor, PTC thermistor) 201 connected in parallel with the capacitor 202. Here, the stator coil 200 consists of four stator coils 160A, 160B, 160C and 160D respectively wound around an iron coil 110 of the induction motor.

Hereinafter, an operation of the induction motor controller in accordance with the first embodiment of the present invention will be described in detail.

Firstly, when the power (AC) is initially applied to power terminals (A and B), the power (AC) is applied to the stator coil 200 only through the PCT thermistor 201. Operation characteristics of the PTC thermistor 201 will be described with reference to FIG. 4 as follows.

Figure 4:
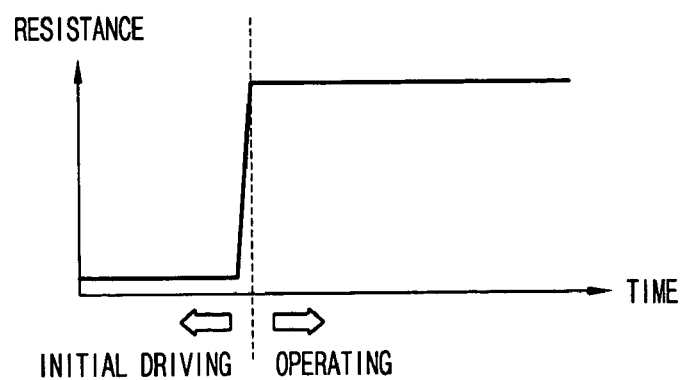
FIG. 4 is a graph showing operational characteristics of a PTC thermistor installed at the induction motor controller in accordance with the first embodiment of the present invention.

FIG. 4 is a graph showing operational characteristics of the PTC thermistor installed at the induction motor controller in accordance with the first embodiment of the present invention.

As shown in FIG. 4, the PTC thermistor 201 has temperature characteristics as follows: the PTC thermistor 201 has so low a resistance value when the power (AC) is initially applied to the induction motor, and it has so high a resistance value when the power (AC) is applied to the induction motor for a predetermined time to heat the PTC thermistor 201.

Accordingly, when the power (AC) is initially applied to the induction motor, a resistance value of the PTC thermistor 201 is very low and thus the power is applied to the stator coil 200 only through the PTC thermistor 201.

An equivalent circuit of the induction motor controller according to the operation of the PTC thermistor 201 will be described with reference to FIGS. 5A and 5B as follows.

Figure 5A:
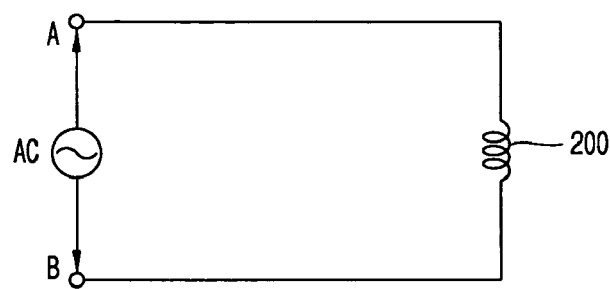
FIGS. 5A and 5B are views showing an equivalent circuit of the induction motor controller in accordance with the first embodiment of the present invention.
Figure 5B:
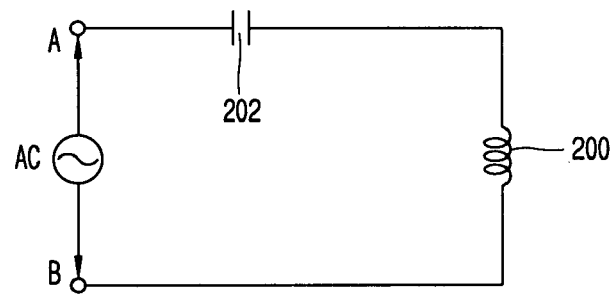

FIGS. 5A and 5B are views showing an equivalent circuit of the induction motor controller in accordance with the first embodiment of the present invention.

As shown in FIG. 5A, when the power (AC) is initially applied to the induction motor, the resistance value of the PTC thermistor 201 is very low. Therefore, the stator coil 200 of the induction motor controller is directly connected to the power terminal (A).

As shown in FIG. 5B, when the power (AC) is applied to the induction motor for a predetermined time, the PTC thermistor 201 is heated and the PTC thermistor 201 has so high a resistance value. Thus, the stator coil 200 and the capacitor 202 are connected in series. Namely, when the power (AC) is applied to the induction motor for a predetermined time, the PTC thermistor 201 is turned-off, and thus the power (AC) is applied to the stator coil 200 only through the capacitor 202.

Hereinafter, a voltage applied to the stator coil 200 according to an operation of the induction motor controller will be described in detail with reference to FIG. 6.

Figure 6:
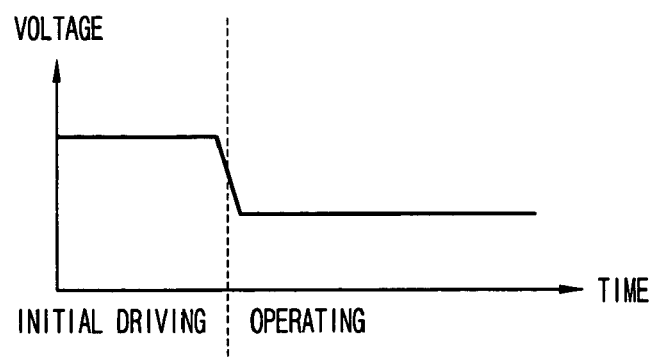
FIG. 6 is a graph showing a change in a voltage applied to stator coils according to an operation of the induction motor controller in accordance with the first embodiment of the present invention.

FIG. 6 is a graph showing a change in a voltage applied to the stator coil according to the operation of the induction motor controller in accordance with the first embodiment of the present invention.

As shown in FIG. 6, when the power (AC) is initially supplied to the induction motor, a high voltage is applied to the stator coil 200. A high magnetomotive force is generated by supplying the high voltage to the stator coil. The induction motor is swiftly driven at the initial stage by the high magnetomotive force.

In addition, after a predetermined time, if an operation of the PTC thermistor 201 is turned-off, the high voltage is reduced through the capacitor 202 and the reduced voltage is applied to the stator coil 200. Namely, if the operation of the PTC thermistor 201 is turned-off, the induction motor is driven (operated) with high efficiency and low power consumption by applying a low voltage to the stator coil 200.

Figure 7:
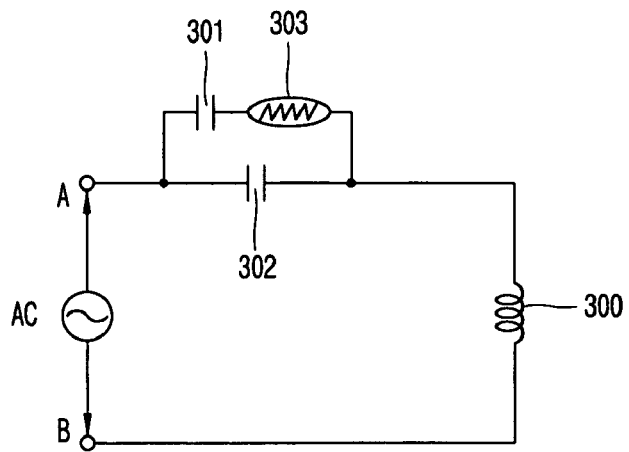
FIG. 7 is a schematic diagram showing a construction of an induction motor controller in accordance with a second embodiment of the present invention.

FIG. 7 is a schematic diagram showing a construction of an induction motor controller in accordance with a second embodiment of the present invention.

As shown in FIG. 7, the induction motor controller in accordance with the second embodiment includes: a first capacitor 302 connected in series between a power terminal (A) and a stator coil 300; a PTC thermistor (Positive Temperature Coefficient thermistor, PTC thermistor) 303 connected in parallel with the first capacitor 302; and a second capacitor 301 connected in series with the PTC thermistor 303. Here, a capacity of the second capacitor 301 is higher than that of the first capacitor 302.

Hereinafter, an operation of the induction motor controller in accordance with the second embodiment of the present invention will be described in detail.

Firstly, when the power (AC) is initially applied to the induction motor, since a resistance value of the PTC thermistor 303 is very low, the power (AC) is applied to the stator coil 300 through the first capacitor 302 and the second capacitor 301. That is, a high voltage is applied to the stator coil 300 by a composite capacity of the second capacitor 301 and the first capacitor 302, so that the induction motor is swiftly driven at the initial stage.

Thereafter, after a predetermined time, if an operation of the PTC thermistor 303 is turned-off, the power (AC) is reduced through the capacitor 302 and the reduced voltage is applied to the stator coil 300. Namely, if the operation of the PTC thermistor 303 is turned-off, the induction motor is driven (operated) with high efficiency and low power consumption by applying a low voltage to the stator coil 300.

Hereinafter, an equivalent circuit of the induction motor controller according to an operation of the PTC thermistor 303 with reference to FIGS. 8A and 8B.

Figure 8A:
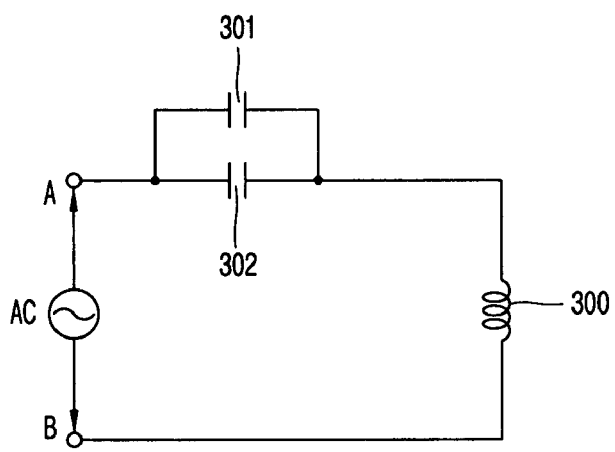
FIGS. 8A and 8B are views showing an equivalent circuit of the induction motor controller in accordance with the second embodiment of the present invention.
Figure 8B:
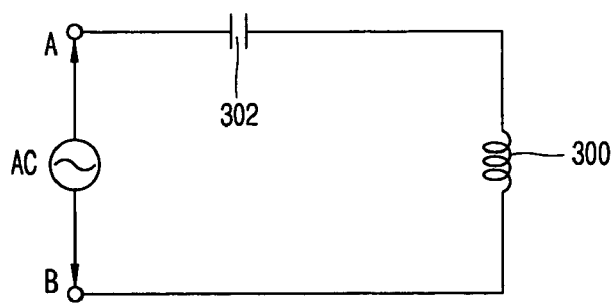

FIGS. 8A and 8B are views showing an equivalent circuit of the induction motor controller in accordance with the second embodiment of the present invention.

As shown in FIG. 8A, when the power (AC) is initially applied to the induction motor, since a resistance value of the PTC thermistor 303 is very low, the first capacitor 302 and the second capacitor 301 connected in parallel with each other are connected to the stator coil 300. Namely, the power is applied to the stator coil 300 through the first capacitor 302 and the second capacitor 301 connected in parallel with each other. Accordingly, a high voltage is applied to the stator coil 300 by a composite capacity of the second capacitor 301 and the first capacitor 302, so that the induction motor is swiftly driven at the initial stage. Here, a voltage applied to the stator coil 300 is proportionally increased according to a capacity of the first capacitor 302 and that of the second capacitor 301.

As shown in FIG. 8B, when the power (AC) is applied to the induction motor for a predetermined time, a resistance value of the PTC thermistor 303 is so high that the PTC thermistor 303 is turned-off, and thus the first capacitor 302 is directly connected to the stator coil 300. Namely, the power is reduced through the first capacitor 302 and the reduced power is applied to the stator coil 300. Accordingly, the power is applied to the stator coil 300 only through the first capacitor 302, so that the induction motor is driven with high efficiency and low power consumption.

Meanwhile, in the present invention, in designing the stator coil, it is preferable to determine the winding number of the stator coil according to the voltage reduced by the capacitor.

As so far described in detail, the induction motor controller in accordance with the present invention swiftly drives the induction motor at the initial stage by applying a high voltage to the induction motor at the initial stage.

In addition, the induction motor controller in accordance with the present invention can drive the induction motor with high efficiency and low power consumption by applying a low voltage to the induction motor after a predetermined time.

Further, since the induction motor controller in accordance with the present invention drives the induction motor with a low voltage after a predetermined time, the winding number of the stator coil of the induction motor can be reduced. Namely, as the voltage applied to the stator coil is lowered, the winding number of the stator coil gets decreased.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A motor controller comprising:
   a first capacitor connected in series with stator coils of a motor;
   a PTC thermistor (Positive Temperature Coefficient thermistor) connected in parallel with the first capacitor; and
   wherein, when power is initially applied to the motor, the power is applied to the stator coils only through the PTC thermistor with low resistance value so that the motor controller is swiftly driven at the initial stage.

2. The motor controller of claim 1, wherein the power is applied to the stator coils only through the first capacitor after the power is applied to the motor for a predetermined time.

3. A motor controller comprising:
   a first capacitor connected in series with stator coils of a motor;
   a PTC thermistor (Positive Temperature Coefficient thermistor) connected in parallel with the first capacitor;
   a second capacitor connected in series with the PTC thermistor with low resistance value, so that the motor controller is swiftly driven when power is initially applied to the motor; and
   wherein a capacity of the second capacitor is higher than that of the first capacitor.

4. The motor controller of claim 3, wherein the power is applied to the stator coils only through the first capacitor and the second capacitor after the power is applied to the motor for a predetermined time.

5. The motor controller of claim 3, wherein the motor controller is an induction motor controller.

6. An induction motor comprising a stator having stator coils respectively wound around an iron core of the induction motor, an induction rotor, a permanent magnet rotor installed between the stator and the induction rotor, and shading coils installed at the iron coil, the induction motor further comprising:
   a first capacitor connected in series with the stator coils;
   a PTC thermistor (Positive Temperature Coefficient thermistor) connected in parallel with the first capacitor; and
   wherein, when the power is initially applied to the induction motor, the power is applied to the stator coils only through the PTC thermistor with low resistance value, so that the induction motor is swiftly driven at the initial stage.

7. The induction motor of claim 6, wherein the power is applied to the stator coils only through the first capacitor after the power is applied to the induction motor for a predetermined time.

8. An induction motor comprising a stator having stator coils respectively wound around an iron core of the induction motor, an induction rotor, a permanent magnet rotor installed between the stator and the induction rotor, and shading coils installed at the iron coil, the induction motor further comprising:
- a first capacitor connected in series with the stator coils;
- a PTC thermistor (Positive Temperature Coefficient thermistor) connected in parallel with the first capacitor;
- further comprising a second capacitor connected in series with the PTC thermistor with low resistance value, so that the induction motor is swiftly driven when power is initially applied to the induction motor; and
- wherein a capacity of the second capacitor is higher than that of the first capacitor.

9. The induction motor of claim 8, wherein the power is applied to the stator coils only through the first capacitor and the second capacitor after the power is applied to the induction motor for a predetermined time.

* * * * *

UNITED STATES PATENT AND TRADEMARK OFFICE
CERTIFICATE OF CORRECTION

| | | |
|---|---|---|
| PATENT NO. | : 7,084,599 B2 | Page 1 of 1 |
| APPLICATION NO. | : 10/994400 | |
| DATED | : August 1, 2006 | |
| INVENTOR(S) | : Seung-Do Han et al. | |

It is certified that error appears in the above-identified patent and that said Letters Patent is hereby corrected as shown below:

At column 6, line 30 (claim 1, line 9) of the printed patent, "value so" should read --value, so--.

Signed and Sealed this

Eleventh Day of December, 2007

JON W. DUDAS
*Director of the United States Patent and Trademark Office*